(12) United States Patent
Goldberg et al.

(10) Patent No.: US 9,335,146 B1
(45) Date of Patent: May 10, 2016

(54) DIMENSIONAL MEASUREMENT APPARATUS FOR A CYLINDRICAL OBJECT

(71) Applicants: Nicholas S. Goldberg, Perris, CA (US); Raymond S. Leon, Corona, CA (US); Kevin R. Orlowski, Corona, CA (US)

(72) Inventors: Nicholas S. Goldberg, Perris, CA (US); Raymond S. Leon, Corona, CA (US); Kevin R. Orlowski, Corona, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/603,754

(22) Filed: Jan. 23, 2015

Related U.S. Application Data

(63) Continuation-in-part of application No. 14/302,656, filed on Jun. 12, 2014.

(60) Provisional application No. 61/932,844, filed on Jan. 29, 2014.

(51) Int. Cl.
| | | |
|---|---|---|
| *G01B 7/14* | (2006.01) | |
| *G01B 5/20* | (2006.01) | |
| *G01B 5/24* | (2006.01) | |

(52) U.S. Cl.
CPC ... *G01B 5/20* (2013.01); *G01B 5/24* (2013.01)

(58) Field of Classification Search
CPC .............. G01R 33/093; G01R 15/207; H01L 21/67253; G01N 21/9501
USPC ................. 324/724, 600, 452–453, 500, 514, 324/754.04, 207.15–207.25; 340/870.36; 74/89, 89.23, 89.35
See application file for complete search history.

(56) References Cited

U.S. PATENT DOCUMENTS

| | | | |
|---|---|---|---|
| 4,918,627 A | | 4/1990 | Garcia et al. |
| 5,208,763 A | * | 5/1993 | Hong .................... G05B 19/402 700/192 |
| 5,586,052 A | | 12/1996 | Iannuzzi et al. |

(Continued)

OTHER PUBLICATIONS

U.S. Appl. No. 61/932,844, filed Jan. 29, 2014, title "Gage for Measuring Critical Dimension Surfaces of a Rolling Airframe Missile Rocket Motor," inventors Nicholas S. Goldberg, Raymond S. Leon, and Kevin R. Orlowski.

(Continued)

*Primary Examiner* — Melissa Koval
*Assistant Examiner* — Trung Nguyen
(74) *Attorney, Agent, or Firm* — Howard Kaiser

(57) ABSTRACT

According to exemplary inventive practice, a cylindrical object is secured by a rotatable mechanism. Via a motor controller and corresponding motor actuators, a computer exercises motional control as follows: (i) rotation of the rotatable mechanism, and hence of the cylindrical object, about the cylindrical axis; (ii) linear movement of a positionally adjustable LVDT along the cylindrical axis; and, (iii) linear movement of the positionally adjustable LVDT perpendicular to the cylindrical axis. The computer varies the rotational position of the cylindrical axis, varies the Cartesian planar/spatial position of the positionally adjustable LVDT, and receives measurements taken by the positionally adjustable LVDT under these varying conditions. Based on the measuremental input, the computer evaluates the surface profile of the cylindrical object. Exemplary inventive practice may also provide for at least one fixed LVDT providing measurements relating to cylindrical length and/or cylindrical end surface profile (e.g., in terms of axial perpendicularity).

20 Claims, 9 Drawing Sheets

(56) References Cited

U.S. PATENT DOCUMENTS

| | | |
|---|---|---|
| 5,687,094 A | 11/1997 | Kagawa et al. |
| 5,771,044 A | 6/1998 | Cragun et al. |
| 5,956,251 A | 9/1999 | Atkinson et al. |
| 6,822,745 B2 | 11/2004 | De Groot et al. |
| 6,879,933 B2 | 4/2005 | Steffey et al. |
| 7,024,263 B2 | 4/2006 | Drake, Jr. et al. |
| 7,188,429 B2 * | 3/2007 | Haidler ............ G01B 5/0028 33/542 |
| 7,194,387 B1 | 3/2007 | Filatov et al. |
| 7,590,497 B2 | 9/2009 | Tornquist et al. |
| 7,924,435 B2 | 4/2011 | Colonna De Lega et al. |
| 7,948,636 B2 | 5/2011 | De Groot et al. |
| 7,952,724 B2 | 5/2011 | De Lega et al. |
| 8,041,527 B2 | 10/2011 | Day et al. |
| 8,087,004 B2 | 12/2011 | Sims, Jr. et al. |
| 8,355,895 B2 | 1/2013 | Sims, Jr. |
| 8,423,325 B2 | 4/2013 | Sims, Jr. |
| 8,698,891 B2 | 4/2014 | Turner et al. |
| 2011/0191057 A1 | 8/2011 | Sheehan |

OTHER PUBLICATIONS

U.S. Appl. No. 14/302,656, filed Jun. 12, 2014, title "Measuremental Evaluation of Dimensional Tolerancing Compliance of a Cylindrical Object," inventor Raymond Steve Leon.

* cited by examiner ated on Jan. 29, 2014, title "Gage for Measuring

DIMENSIONAL MEASUREMENT APPARATUS FOR A CYLINDRICAL OBJECT

CROSS-REFERENCE TO RELATED APPLICATIONS

This application claims the benefit of U.S. provisional application Ser. No. 61/932,844, incorporated herein by reference, filing date 29 Jan. 2014, title "Gage for Measuring Critical Dimension Surfaces of a Rolling Airframe Missile Rocket Motor," inventors Nicholas S. Goldberg, Raymond S. Leon, and Kevin R. Orlowski.

This application is a continuation-in-part of U.S. nonprovisional application Ser. No. 14/302,656, incorporated herein by reference, filing date 12 Jun. 2014, title "Measuremental Evaluation of Dimensional Tolerancing Compliance of a Cylindrical Object," inventor Raymond Steve Leon.

BACKGROUND OF THE INVENTION

The present invention relates to dimensional measurement of objects, more particularly to devices, methods, and systems for performing dimensional measurements of cylindrical objects, for instance performing such measurements for purposes of evaluating compliance of cylindrical objects with engineering tolerances.

Dimensional measurement of cylindrical objects is often difficult and inaccurate. Standard measuring instrumentation (SMI) and coordinate measurement machine (CMM) inspection techniques are widely used to determine whether a part passes or fails precision design criteria. Conventional methods for measuring dimensions of cylindrical objects are often inaccurate, and tend to be difficult, time-consuming, and inconsistent, particularly because of stringent requirements of radial inspection. Dimensional measurement may be critical, for instance, in applications involving cylindrical parts of rockets or missiles, such as rocket tubes or missile tubes.

One conventional approach to measuring the geometric dimensioning and tolerancing (GD&T) requirements of a cylindrical object (e.g. a cylindrical tube, or "CT") involves implementation of any of various open setups using standard measuring equipment. Measurement of dimensions of components can take, for instance, three hours or more to perform. Another conventional approach to measuring the GD&T requirements of a cylindrical object makes use of a coordinate measuring machine (CMM). This conventional method is time-consuming as well, and requires a highly skilled operator to ensure proper interpretation of the component drawing when writing the CMM inspection program. In addition, a CMM is limited insofar as it cannot properly measure the outer diameter on a long CT, since a typical CMM requires the cylindrical object to be moved during the middle of the inspection process.

SUMMARY OF THE INVENTION

The present invention, as frequently embodied, represents a better device for verifying critical interfaces of a cylindrical object, including but not limited to surface profile, and/or axial perpendicularity, and/or true positions of holes and tabs. According to exemplary inventive practice, dimensional measurements are performed in order to evaluate compliance of a cylindrical object with one or more engineering tolerancing standards pertaining to that cylindrical object. An exemplary inventive gage, synonymously referred to herein as a "measurement gage" or a "fixture gage," performs semi-autonomous measurement of cylindrical surface profile, axial perpendicularity, and true positions of holes and tabs.

In accordance with exemplary practice of the present invention, a dimensional measurement system comprises a securement mechanism, a mobile LVDT, at least one immobile LVDT, a rotational motor, an axial-longitudinal mobility motor, a transverse mobility motor, a motor controller, a conditioning card, and a computer. The securement mechanism rotatably holds a cylindrical object. The cylindrical object has a longitudinal axis, two axial-longitudinal ends, and a circumferential surface between the two axial-longitudinal ends.

The mobile LVDT is movable with respect to the cylindrical object in an axial-longitudinal direction (parallel to the longitudinal axis) and a transverse direction (normal to the longitudinal axis). The rotational motor causes the securement mechanism to rotate the cylindrical object about the longitudinal axis. The axial-longitudinal mobility motor causes the movement of the mobile LVDT in the axial-longitudinal direction. A transverse mobility motor causes the movement of the mobile LVDT in the transverse direction. The motor controller activates the rotational motor, the axial-longitudinal mobility motor, and the transverse mobility motor. The conditioning card conditions LVDT data signals for input into the computer; that is, the conditioning card conditions (as the mobile LVDT data) data signals transmitted by the mobile LVDT, and conditions (as the immobile LVDT data) data signals transmitted by the immobile LVDT. The computer control of the rotational motor, the axial-longitudinal mobility motor, and the transverse mobility motor, includes transmission of motor control signals to the motor controller.

The computer is configured to execute computer code stored on a non-transitory computer readable storage medium so that the computer is capable of inputting mobile LVDT data, inputting immobile LVDT data, outputting motor control data, processing the mobile LVDT data, and processing the immobile LVDT data. The mobile LVDT data includes measurements performed by the mobile LVDT: at plural positions of the mobile LVDT in the axial-longitudinal direction; at plural positions of the mobile LVDT in the transverse direction; and, at plural positions of the cylindrical object in its rotation. The immobile LVDT data includes measurements performed by the at least one immobile LVDT at plural positions of the cylindrical object in its rotation. The motor control data controls the rotational motor, the axial-longitudinal mobility motor, and the transverse mobility motor. The mobile LVDT data is processed to obtain information relating to the configuration of the cylindrical object (e.g., including information relating to the shape of said circumferential surface of said cylindrical object). The immobile LVDT data is processed to obtain information relating to the configuration of the cylindrical object (e.g., including information relating to the length of the cylindrical object and/or the shape of the cylindrical object in an area at at least one axial-longitudinal end of the cylindrical object).

Inventive practice may concern, for example, dimensional runout tolerancing and/or dimensional profile tolerancing. The object being evaluated has a cylindrical surface and an axis of rotation. Distance measurements are taken by at least one sensor (e.g., linear variable differential transformer) with respect to the object at plural different rotational positions of the object. Each sensor senses the distance from the sensor to the cylindrical surface of the object. Practice of the present invention can greatly reduce inspection time and increase repeatability.

According to exemplary inventive practice, two coaxial chucks are used to establish the centerline of a cylindrical object. The present invention's automated system implements a dual-axis strategy for positioning an LVDT (linear variable differential transformer) in an X-Y geometric plane for measurement of a cylinder surface profile. Surface profile is a characteristic treated in ASME Y14.5 ("Geometric Dimensioning and Tolerancing"), which defines a "zone" within which the surface of a cylinder should lie.

LVDTs are highly accurate measuring devices that output a voltage that can then be transformed into a measurement of length. Using an LVDT, the present invention's automated system measures the perpendicularity of one face of the cylinder (e.g., a substantially flat or planar face) with respect to the previously established centerline of the cylindrical object. Furthermore, using an LVDT, the present invention's automated system measures the overall length of the cylindrical object; this length measurement is based on offset values from the chucks.

Using manual pin checks, an inventive practitioner performs checks of various holes on the cylindrical object, some of which are on the cylindrical object's outer (circumferential) surface and others of which are on the cylindrical object's end surface. These checks can be made to a variety of datum (point from which a measurement is taken) references. The datums important to exemplary inventive practice are the centerline established using the chucks, the perpendicular face measured using an LVDT, and the hole checks performed using manual pin checks. The spin-up tab checks can be considered to be part of the manual pin checks.

A computer system executing custom software is connected to the motor controller and the LVDT conditioning card. A computer receives electrical data signals from the LVDTs via the LVDT conditioning card, and transmits electrical control signals to the electric motors via the electric motor controller. The LVDT conditioning card conditions the LVDT data signals for receipt by the computer. The motor controller communicates outputs to the electric motors; the LVDT conditioning card communicates inputs from the LVDTs. Exemplary inventive practice affords safety features such as utilizing switches (e.g., micro-switches or optical sensors) to prevent injury to the operator, or damage to the inventive gage and/or cylindrical object being measured.

Corresponding calibration blocks for all three LVDTs are integrated so as to permit the LVDTs to be linearized (e.g., made to read properly) on a daily basis. One of these calibration blocks—viz., the surface profile LVDT mastering block—is read through an autonomous routine. The other two calibration blocks—viz., the perpendicularity LVD mastering block and the length LVDT mastering block—are manually moved at the instruction of the software.

The aforementioned co-pending U.S. application Ser. No. 14/302,656 of Leon, filed 12 Jun. 2014, is incorporated herein by reference. Exemplary inventive practice implements an inventive gage in furtherance of evaluating compliance of a cylindrical object with dimensional tolerancing. For example, in accordance with exemplary computer program logic disclosed by Leon's U.S. application Ser. No. 14/302, 656, a computer inputs sensory measurement data (e.g., voltage values), converts the sensory measurement data to linear measurement values, prescribes at least one dimensional tolerance standard, and decides whether the object either (i) passes dimensional tolerancing or (ii) fails dimensional tolerancing. The pass-versus-fail decision involves comparison of the linear measurement values (obtained from the sensory measurement data) with the prescribed dimensional tolerance standard(s). The object is deemed to pass dimensional tolerancing if the object completely conforms to the prescribed dimensional tolerance standard(s). The object is deemed to fail dimensional tolerancing if the object does not completely conform to the prescribed dimensional tolerance standard(s).

The terms "tolerancing" and "engineering tolerancing" are used interchangeably in Leon '656 to broadly refer to one or more acceptable limits of an object as prescribed by engineering design or engineering intent of the object. The tolerancing relates to one or more physical properties (size, shape, dimensions, distance, spacing, configuration, etc.) of the object, or of one or more parts or components of the object.

The present invention can be practiced to measure a variety of cylindrical objects, and to verify their dimensional conformance to drawing requirements in a variety of applications, including but not limited to applications involving cylindrical parts of rockets or missiles such as rocket tubes or missile tubes. Exemplary inventive practice implements a dimensional measurement gage in conjunction with electronic components including a computer and a computer display. The computer includes a processor and memory/storage, both volatile and non-volatile, and has software resident in its memory/storage such as including an algorithmic embodiment disclosed in U.S. application Ser. No. 14/302, 656.

The term "cylindrical object," as used herein, is not limited to an object that is a cylinder in a strict geometric sense. Rather, the term "cylindrical object" encompasses multifarious cylindrical-like shapes. As broadly defined herein, the term "cylindrical object" refers to any object that, to at least a substantial degree, is characterized by a geometric longitudinal axis and by cylindricality of one or more of its surfaces with respect to its geometric longitudinal axis. For instance, a cylindrical object may have non-cylindrical character in terms of having plural cylindrical portions describing different diameters/circumferences, or in terms of having one or more portions that are non-cylindrical, e.g., rectangular or conical, or that have protuberances or projections. The present invention can be practiced efficaciously with respect to cylindrical objects of diverse shapes.

Conventional methods of inspection require standard measuring instrumentation (SMI) inspections along with coordinate measuring machine (CMM) inspections. In order for SMI and CMM inspections to be effective, the operator must be thoroughly familiar with proper SMI and CMM setup techniques, and the setups must be consistent among operators. Furthermore, due to the need for operational rotation of a cylindrical object such as a BLK2 RAM, the SMI and CMM inspections cannot fully and adequately measure the surface profile of the cylindrical object without elaborate inspection setups or repositioning of the cylindrical object during the inspection. Either of these compromises reduces repeatability, and hence reduces the quality of the measurement. Even with the proper setup and a skilled operator, variances among operators may exist.

In contrast to conventional methodologies of inspection, the present invention automates the inspection process and provides a fixed setup to be used by all operators. Accordingly, the present invention significantly decreases measurement error and significantly increases repeatability. In addition, data obtained during the present invention's automated measurement is immune to manipulation by the user, whether intentional or unintentional manipulation.

A Rolling Airframe Missile (RAM) is a small lightweight surface-to-air missile used mainly to defend ships against missile attack. The word "rolling" refers to the rolling of the missile on its longitudinal axis for stability during flight. A more recent RAM version is particularly adapted to countering upgraded anti-ship missiles and is known as the "RAM Block 2" or "BLK2 RAM." Trueness of external surfaces to design specifications is quite important in a RAM so that the rolling that occurs during flight results in requisite stabilization, rather than be counterproductive thereto.

In the manufacture of a Rolling Airframe Missile Block 2, interface surfaces of the rocket motor are measured to make sure that the rocket motor meets dimensional requirements and design tolerances. Current practice of performing these measurements is to use conventional measuring instruments in combination with a coordinate measurement machine. This current practice is time-consuming and prone to inconsistency. In contrast to current practice, inventive practice can measure interface surfaces of a cylindrical object such as a Rolling Airframe Missile in a more timely and consistent manner.

BRIEF DESCRIPTION OF THE DRAWINGS

The present invention will now be described, by way of example, with reference to the accompanying drawings, wherein:

FIG. 3 shows a cylindrical object positioned for measurement by the inventive apparatus.

Figure 1:
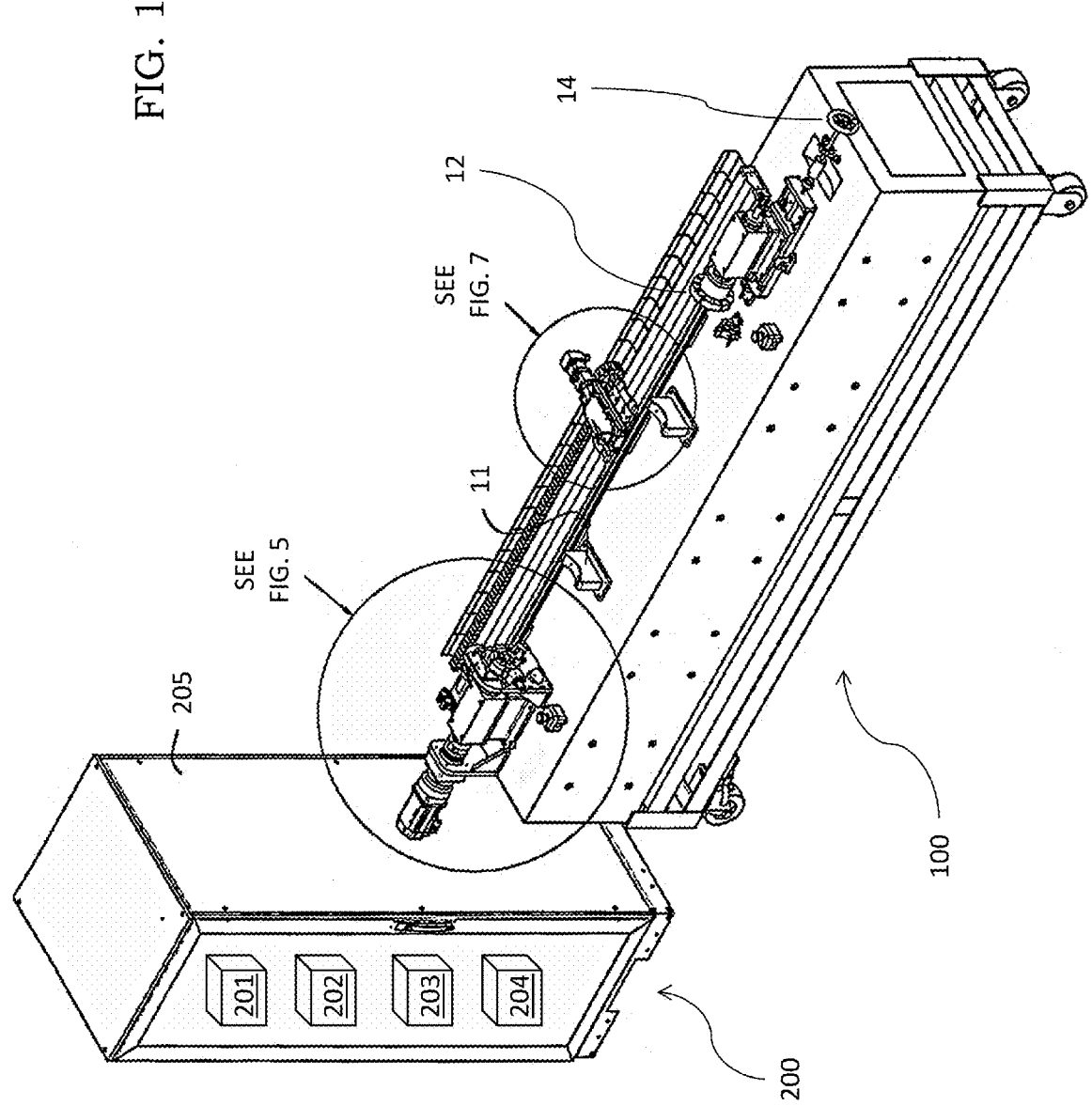
FIG. 1 is a front right elevation perspective view of an example of dimensional measurement apparatus in accordance with the present invention. The inventive apparatus includes a measurement gage and a server rack.
Figure 2:
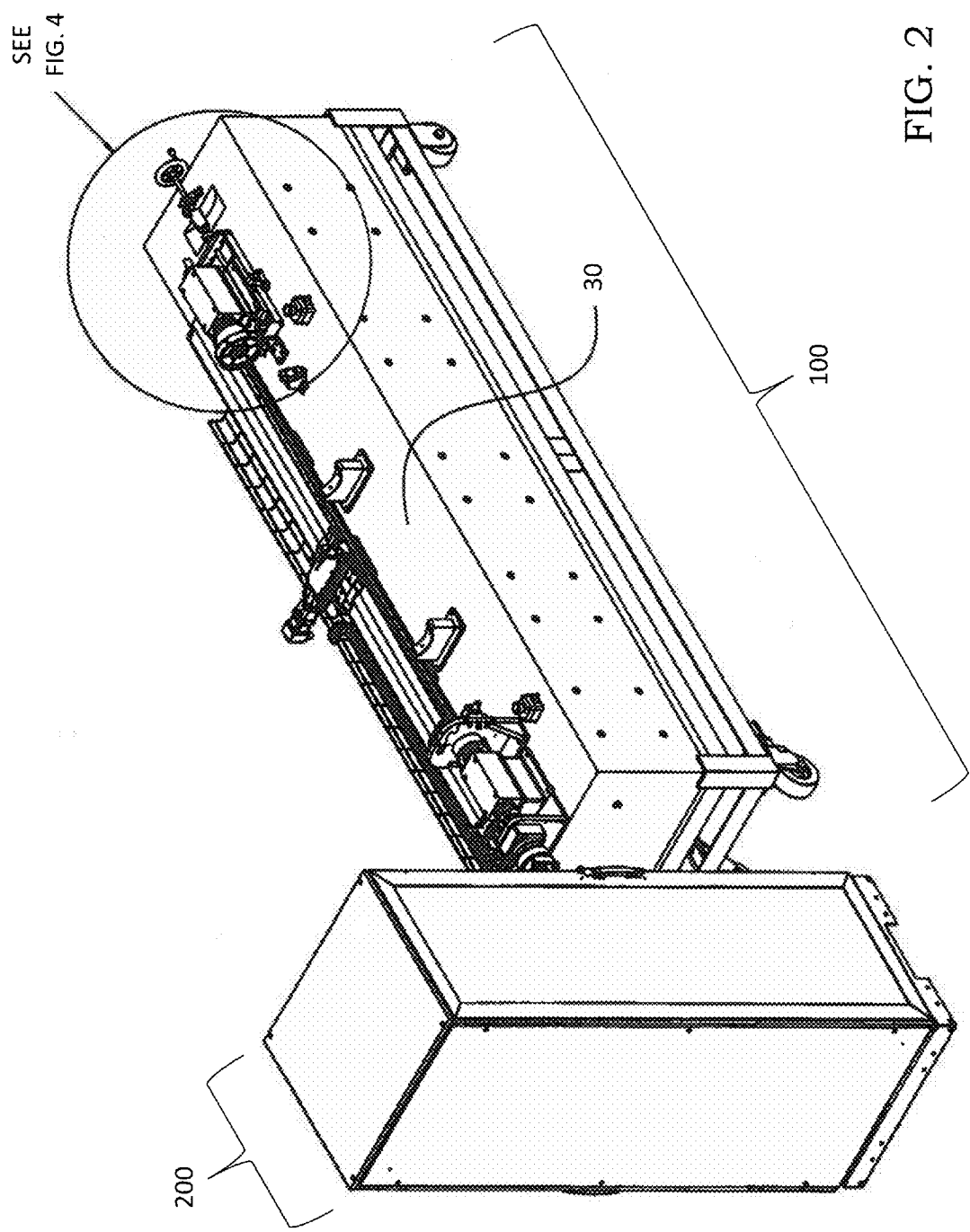
FIGS. 2 and 3 are front left elevation perspective views, similar to each other, of the inventive apparatus shown in FIG. 1. As distinguished from FIG. 2.

DESCRIPTION OF EXEMPLARY
EMBODIMENTS OF THE INVENTION

The drawings illustrate, by way of example, inventive practice involving measurement and verification of physical dimensions of critical surfaces of a cylindrical object 300. An example of a cylindrical object 300 that can be inspected by implementing inventive embodiments such as shown in the drawings is a cylindrical tube-like rocket motor section of a Rolling Airframe Missile (RAM). The exemplary apparatus of the present invention includes a dimensional measurement gage 100 and a rack-mounted electronics unit 200. Exemplary inventive practice is characterized by a rotational A-axis, a longitudinal X-axis, a lateral or diametrical Y-axis, a three-dimensional (xyz) coordinate system, and a centerline geometric plane C. The figures are schematic in nature, and some portions thereof are not drawn to scale.

The present invention's dimensional measurement gage 100 includes two stationary rests 11, an aft chuck 12, a moveable tailstock 13, a rear hand wheel 14, a sliding forward datum surface 15, a torque limiter 16, a forward chuck 17, a primary datum pin 18, a perpendicularity pin 19, a lower pin 20, a sliding envelope pin 21, a length calibration pin 22, an A-axis motor (rotational drive motor) 23, an in-line planetary gearbox 24, a surface profile LVDT 25, a Y-axis precision slide table 26, an X-axis precision slide table 27, a back datum plate 28, a perpendicularity LVDT 29, a granite surface plate 30, a length LVDT 31, a surface profile LVDT mastering block 32, a perpendicularity LVDT mastering block 33, a length LVDT mastering block 34, a length LVDT calibration pin 35, a rear handle 36 (of gage 100), two emergency stop switches 37, a Y-axis motor 38, an X-axis motor 39, fiber optic sensor switches 40, and two mechanical snap action switches 41. Surface profile LVDT 25 is movable. Perpendicularity LVDT 29 and length LVDT 31 are each stationary.

The present invention's rack-mounted electronics unit 200 includes a personal computer (PC) 201, an uninterruptable power supply (UPS) 202, a motor controller 203, an LVDT conditioning card 204, and a server rack (e.g., enclosure or cabinet) 205. Electronic components including 201, 202, 203, and 204 are housed by server rack 205. Depending on the inventive embodiment, the server rack may house same, fewer, or additional components vis-à-vis that which is exemplified herein.

Computer 201 communicates with a motor controller and with plural linear variable differential transformers (LVDTs). The communication between computer 201 and the LVDTs may be facilitated, for instance, using a conditioning card, a terminal block, and a ribbon cable, such as described in U.S. application Ser. No. 14/302,656. According to many inventive embodiments, the hardware and firmware items interfacing with computer 201 are commercial off-the-shelf items. A linear variable differential transformers (LVDT) is a known kind of sensing device, and a number of LVDT sensor (e.g., transducer) products are commercially available that may be suitable for inventive practice. An LVDT converts linear position or motion to a proportional electrical output voltage.

Figure 9:
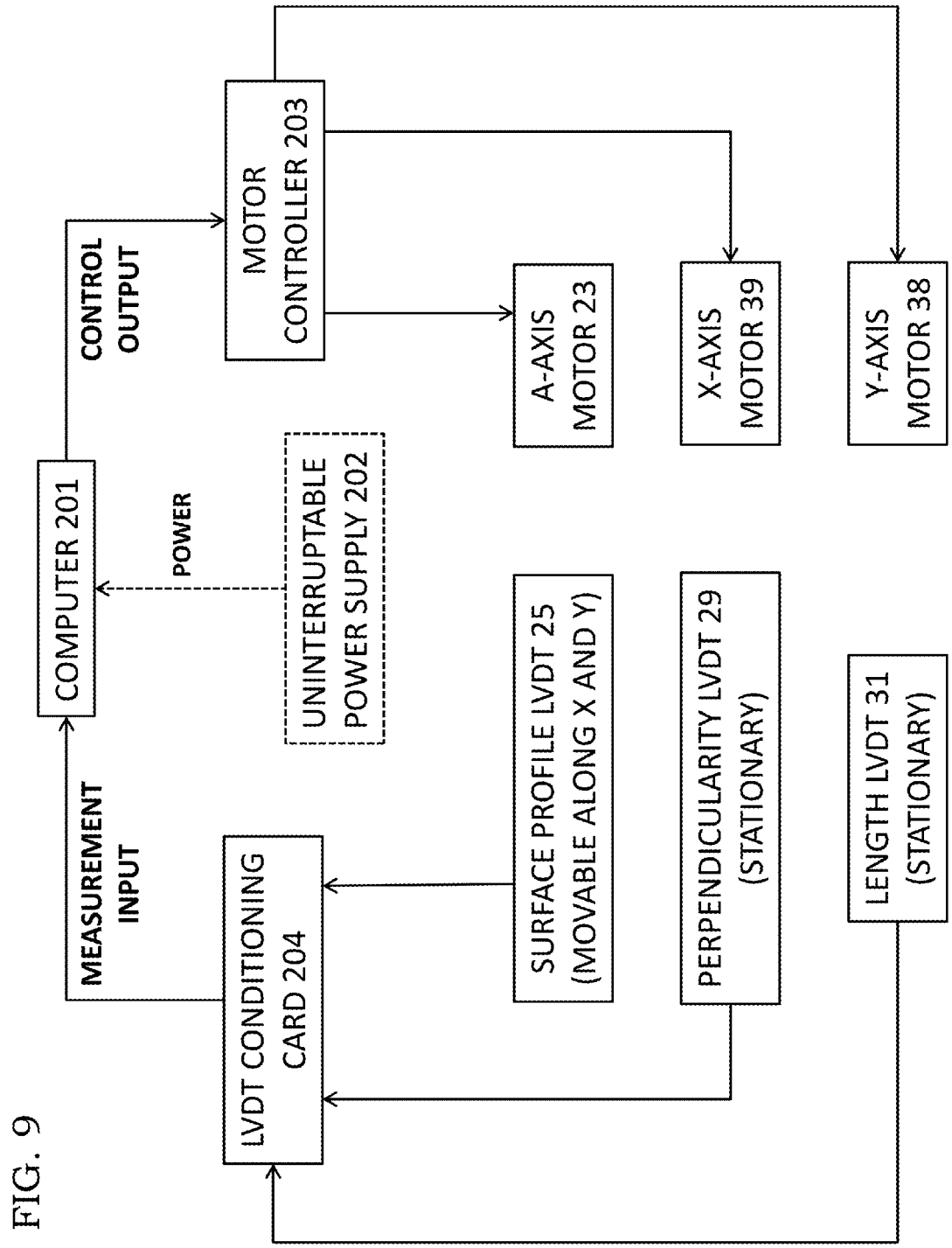
FIG. 9 is a block diagram illustrating computer output of command signals and computer input of measurement signals, in accordance with exemplary practice of the present invention. The computer transmits command signals that effect rotation of a cylindrical object being measured, and that effect X-Y linear movement of LVDTs being implemented. The computer receives measurement signals that are indicative of measurements taken by the LVDTs.

Inventive gage 100 performs dimensional measurements of a cylindrical object 300, for instance a cylindrical tube-like object such as a RAM Block 2 (BLK2 RAM) rocket motor. As illustrated in FIG. 9, computer 201 communicates computer control signals to motor controller 203, which in turn communicates motor control signals to the actuating motors (viz., A-axis motor 23, X-axis motor 39, and Y-axis motor 38). The LVDTs (viz., surface profile LVDT 25, perpendicularity LVDT 29, and length LVDT 31) communicate measurement signals to LVDT conditioning card 204, which in turn communicates conditioned measurement signals to computer 201.

An operator manually places cylindrical object 300 on the non-movable rests 11 of gage 100. Aft chuck 12, mounted on a moveable tailstock 13, is manually driven using rear hand wheel 14 to position rocket motor 300 between aft chuck 12 and sliding forward datum surface 15. The proper longitudinal position is reached when torque limiter 16 indicates the proper force. Forward chuck 17 and aft chuck 12 are then expanded and contracted, respectively, to secure and establish vertical geometric centerline plane C of the rocket motor. The rocket motor is then manually rotated and clocked by the primary datum pin 18 to finalize the datum simulator. Sliding forward datum surface 15 is then retracted.

Prior to the manual pin checks, the operator inputs (into the software database) data regarding features such as the component drawing number, serial number, inspection number, and operator number. This data, along with all inspection data, are placed into a database for future reference. Additional information may also be placed into the software. The operator inputs all relevant pass/fail data into the database as the manual pin check progresses. Once the forward pin checks are completed, the operator completes the first aft pin check. Upon the completion of the first aft pin check, the software control enables rotational drive motor 23, while the primary datum pin (clocking pin) 18 is inserted. After rotational drive motor 23 is enabled, primary datum pin 18 is retracted.

The software control performs a check of the fiber optic sensor safety switches 40 to determine if any pins remain engaged. If a pin is left in place, the software control will not allow the rotational drive motor 23 to rotate in order to prevent damage to the cylindrical object 300 and/or the gage 100. If no pins are engaged, the software control allows rotational drive motor 23 to rotate a set offset to the next aft rocket motor tab. The software control then pauses to allow the operator to check the position of the tab using the sliding envelope pin 21. The operator inputs the results into the software database, and the software control will again check for pin engagement. If no pins are found to be engaged, rotational drive motor 23 advances to the next tab.

Manual pin checks are performed. Perpendicular pin 19 and lower pin 20 are then engaged into rocket motor 300 to verify proper locations of those critical components. Depending on the inventive application, these and other features may or may not exist in or in relation to the cylindrical object being measured. If all three pins (i.e., the primary datum pin 18, the perpendicularity pin 19, and the lower pin 20) are able to engage (insert) simultaneously, rocket motor 300 passes the forward pin check. Perpendicular pin 19 and lower pin 20 are then removed.

The aft pin check is then performed using the primary datum pin 18 and the sliding envelope pin 21. While primary datum pin 18 is engaged, sliding envelope pin 21 must be able to slide into position, completely enveloping the aft rocket motor tab. When primary datum pin 18 and sliding envelope pin 21 are able to engage rocket motor 300 simultaneously, rocket motor 300 passes the first aft pin check. Depending on the application of the present invention, the cylindrical object may not have aft component checks, or may have any combination of pin and/or tab checks.

Once the manual pin checks have been performed, the automated inspection may be performed. That is, after all forward and aft pin checks are successfully completed and found to be within the allowable tolerances of rocket motor 300, the software control allows the operator to proceed with the fully automated portion of the testing. The primary datum pin 18 remains in place, and all other pins that have been inserted into rocket motor 300 are retracted.

In exemplary practice of the present invention the automated inspection is performed using software suitable or developed for a particular application, such as software involving algorithmic logic disclosed by the aforementioned U.S. application Ser. No. 14/302,656. This inventive software is maintained on a stand-alone personal computer (PC) 201 in server rack 200, the components of which are associated with inventie gage 100. Server rack 200 houses computer 201, uninterruptable power supply (UPS) 202, motor controller 203, and LVDT conditioning card 204. Server rack 200 can also house a printer, a touchscreen display, and other ancillary equipment that facilitates operation of inventive gage 100.

Figure 3:
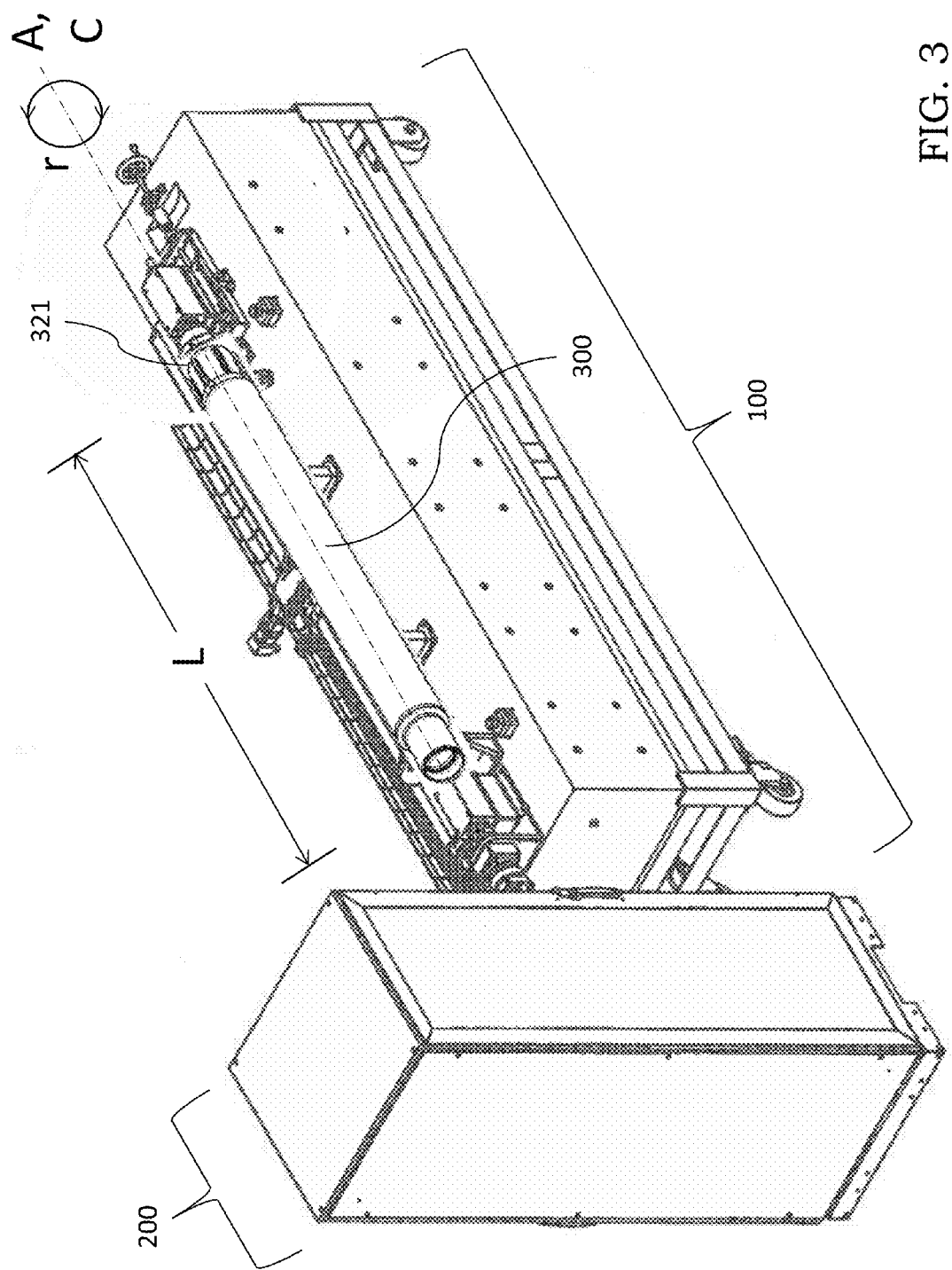
Figure 4:
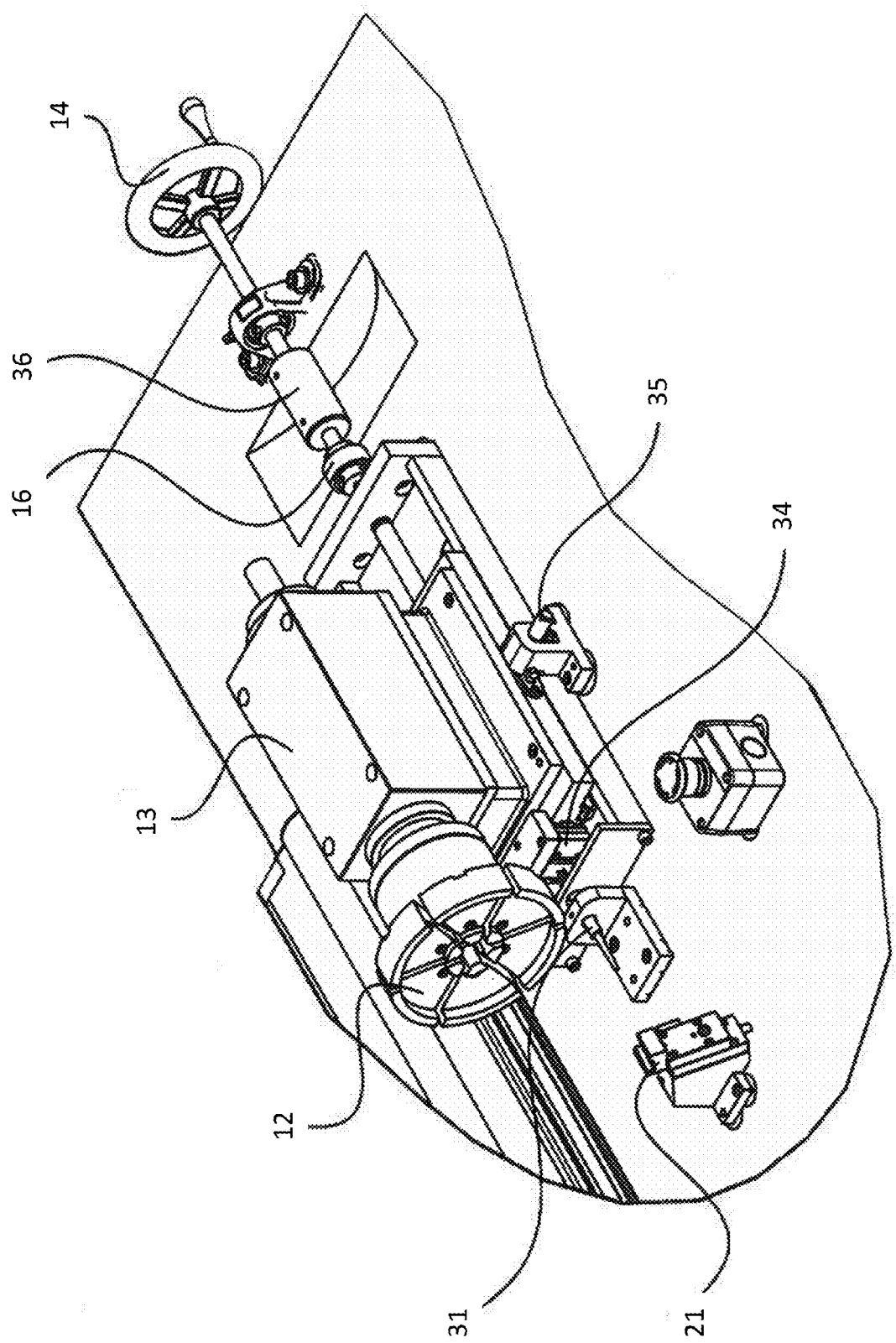
FIG. 4 is a partial and enlarged version of the view shown in FIG. 2, showing a portion of the inventive gage and in particular showing the aft pin assemblies and the tailstock assembly.
Figure 5:
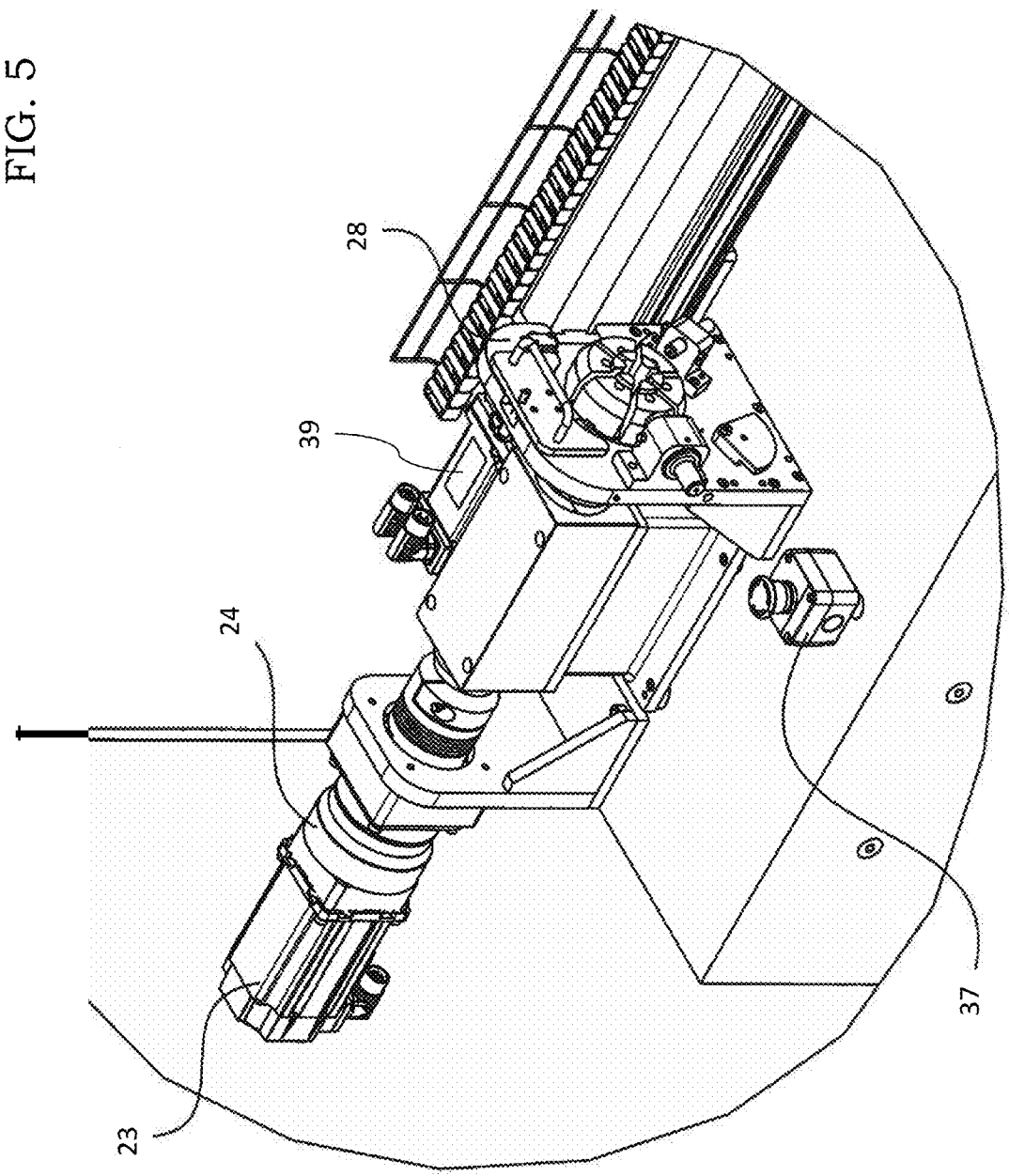
FIG. 5 is a partial and enlarged version of the view shown in FIG. 1, showing a portion of the inventive gage and in particular showing the forward pin checks, headstock, rotational drive motor, and gearbox.
Figure 6:
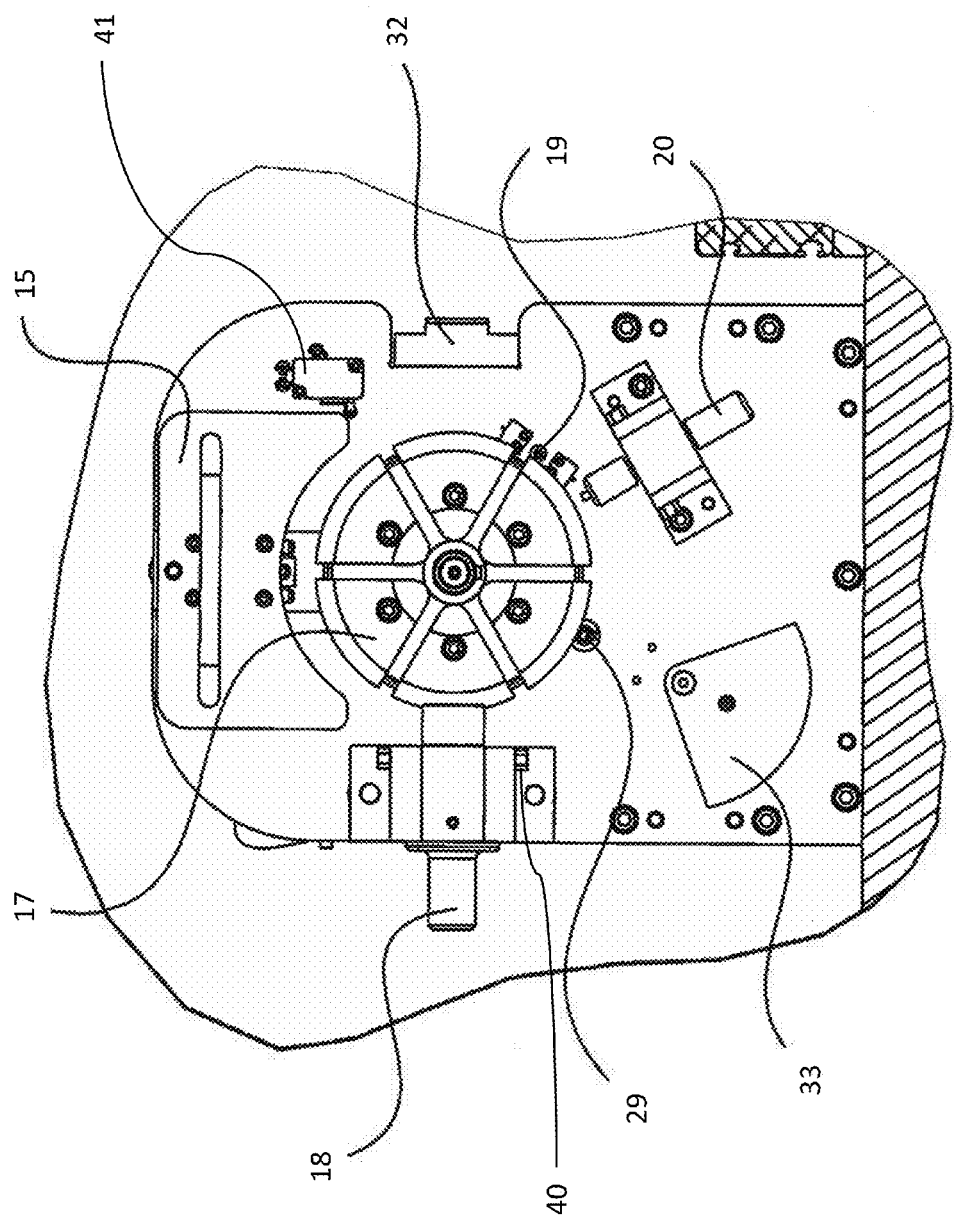
FIG. 6 is an elevation view of a portion of the inventive gage depicted in the figures, in particular showing the forward datum surface components.
Figure 8:
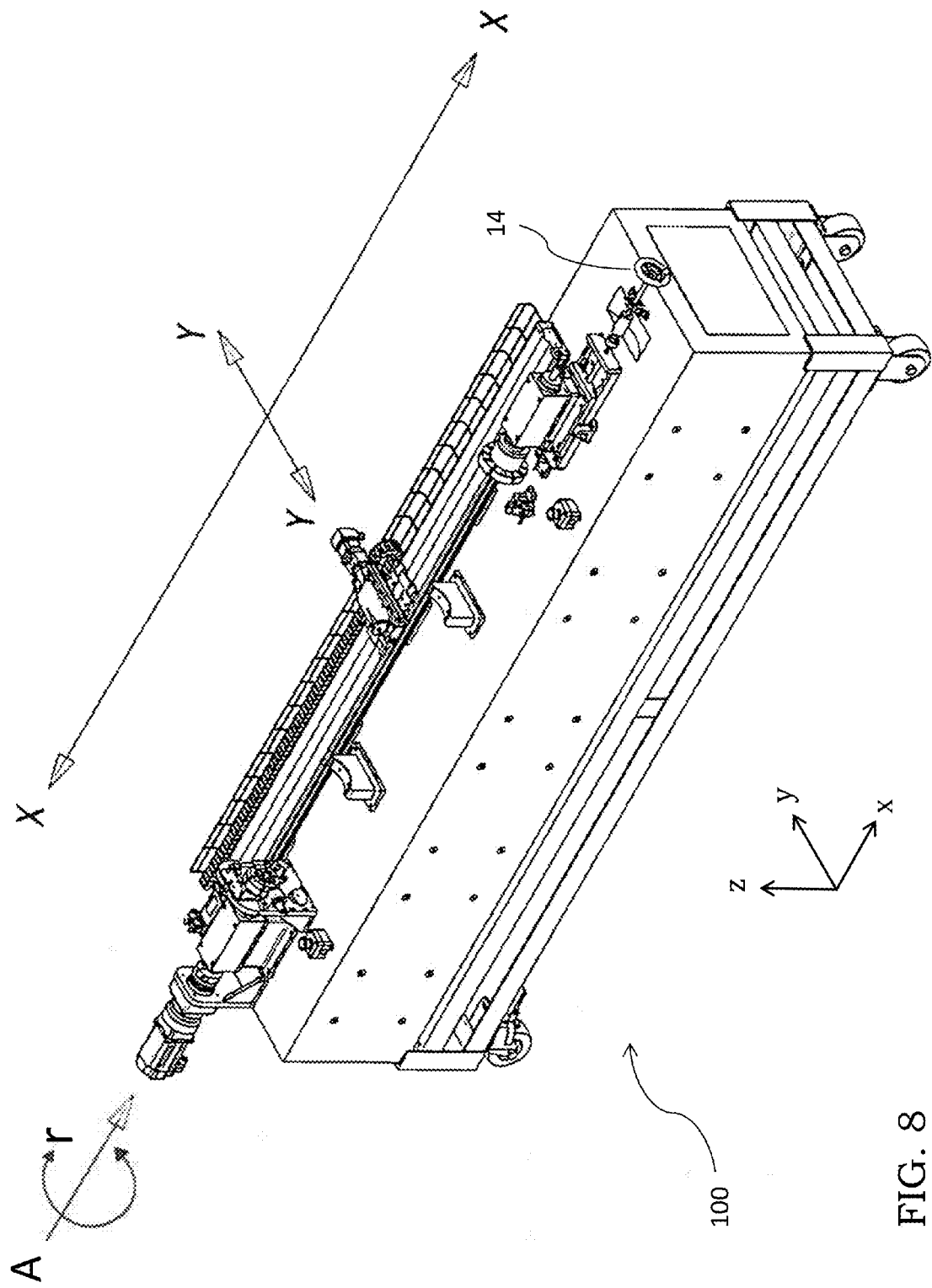
FIG. 8 is a partial and enlarged version of the view shown in FIG. 1, showing the inventive gage (but not the server rack), in particular illustrating the three axes or degrees of motion (linear direction along X-axis, linear direction along Y-axis, rotational direction r about A-axis) during performance of measurement and inspection in accordance with the present invention

The fully automated test performed by the inventive measurement apparatus uses a combination of three motors and three linear variable differential transformers (LVDTs) to check (i) the surface profile of cylindrical object 300, (ii) the forward perpendicularity of cylindrical object 300 (e.g., the perpendicularity of an end face 321 with respect to the geometric longitudinal axis A of cylindrical object 300), and (iii) the length of cylindrical object 300 (e.g., the length L of cylindrical object 300 along the geometric longitudinal axis A of cylindrical object 300). Depending on the cylindrical object to be inspected, the present invention's fixture gage 100 may be variously embodied to have any combination of LVDTs and motors to accomplish the inspection. Commands sent via the computer software to the 3-axis motor controller 203 cause movement of one of the three axes used to inspect the surface profile. As indicated in FIG. 3 and FIG. 8, the three axes used are (i) the rotational A-axis of cylindrical object 300, (ii) the longitudinal (or flight) X-axis relative to cylindrical object 300, and (iii) the lateral (or diametrical) Y-axis relative to cylindrical object 300.

Figure 7:
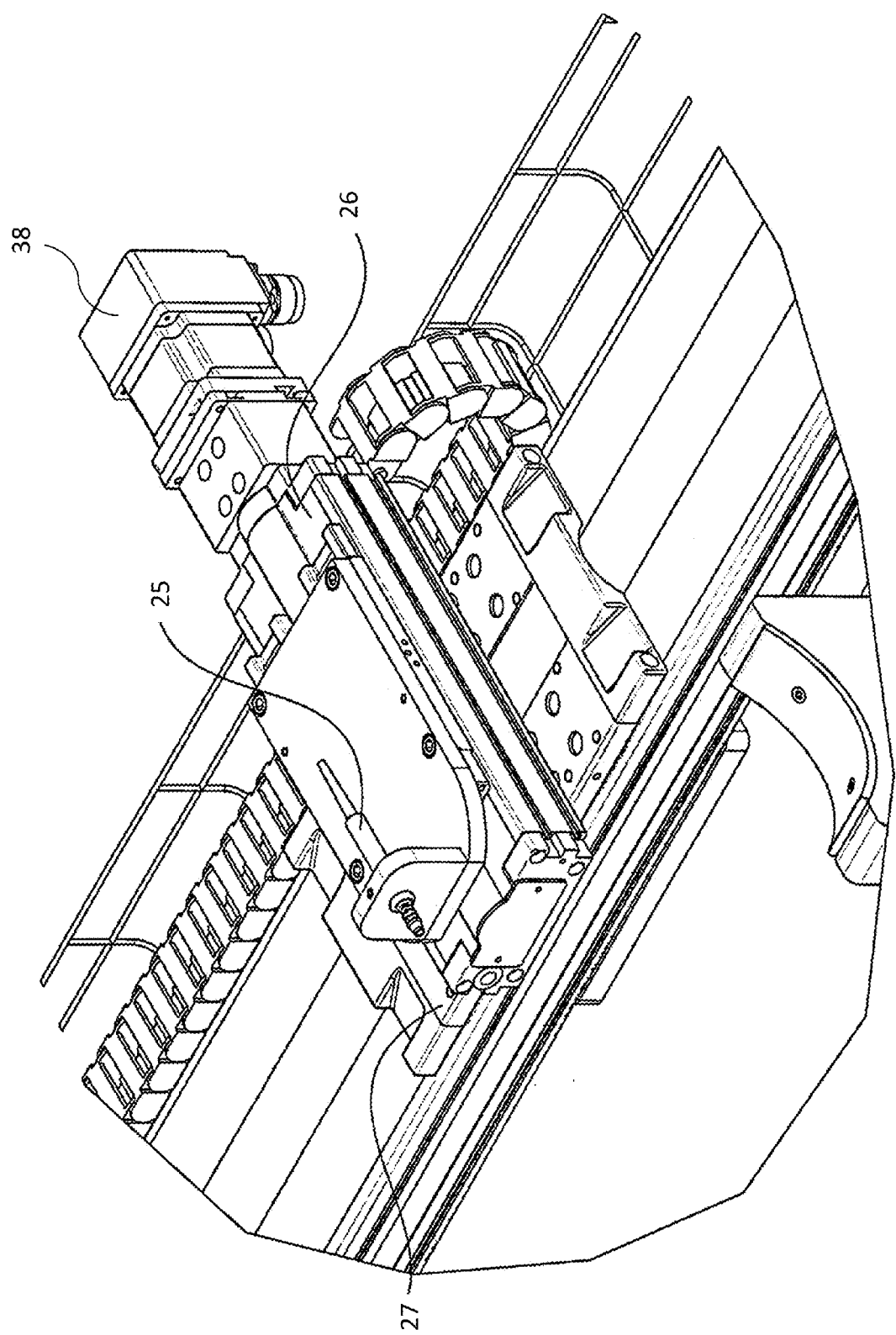
FIG. 7 is a partial and enlarged version of the view shown in FIG. 1, showing a portion of the inventive gage and in particular showing the surface profile linear variable differential transformer assembly.

The rotational A-axis is controlled by A-axis motor (rotational drive motor) 23. The A-axis has an in-line planetary gearbox 24 placed between the motor and the spindle. Gearbox 24 accounts for the inertial mismatch between rocket motor 300 and A-axis drive motor 23. The X-axis motor 39 controls the precision slide table 27. Depending on the inventive embodiment, the A-axis may or may not require an inline planetary gearbox situated between motor and spindle. The Y-axis motor 38 controls the Y-axis precision slide table 26. The LVDT used to measure the surface profile, indicated in FIG. 7 as surface profile LVDT 25, is mounted on Y-axis precision slide table 26. Y-axis precision slide table 26 allows the LVDT to move inward and outward, perpendicular to centerline geometric plane C of rocket motor 300, and adjustable to conform to the various diameters encountered along the length of rocket motor 300. The same LVDT may also be used to measure other parameters of a cylindrical object, such as runout, total runout, diameter, or perpendicularity.

Vertical centerline plane C is the vertical geometric plane in which lies the A-axis of rocket motor 300. The Y-axis precision slide table 26 is mounted onto the X-axis precision slide table 27. X-axis precision slide table 27 moves parallel to centerline plane C of cylindrical object 300. The movement of the X-axis precision slide table 27 allows surface profile LVDT 25, which measures surface profile of cylindrical object 300, to travel to various inspection locations along the length of cylindrical object 300.

To inspect the surface profile of cylindrical object 300, surface profile LVDT 25 travels to several predetermined locations along the length of cylindrical object 300. The gage 100 software automatically moves surface profile LVDT 25 along the X-axis, using X-axis precision slide table 27 and X-axis motor 39, to a predetermined location along the length of cylindrical object 300. Y-axis motor 38 then moves surface profile LVDT 25 toward centerline plane C of cylindrical object 300, to the proper nominal diameter of the location along the X-axis. The nominal diameter compresses surface profile LVDT 25 to the center of the limits of travel. This is to ensure proper operation of surface profile LVDT 25.

Cylindrical object 300 is then rotated 360° (a set angular distance) using the A-axis motor 23. Depending on the inventive embodiment, this set angular distance may be 360 degrees or a different angular distance. Data points from surface profile LVDT 25 are taken at predetermined angular locations as cylindrical object 300 rotates. Deviations from the nominal diameter are recorded by the software, and an algorithm calculates the surface profile at that location. This process continues down the length of cylindrical object 300, until sufficient X-axis locations and angular locations are recorded. As used in this context, the word "sufficient" refers to the number of points necessary to ensure proper surface profile inspection.

Perpendicularity LVDT 29 is affixed to the back datum plate 28, and is used to measure the perpendicularity of the cylindrical object 300's forward mating surface. That is, perpendicularity LVDT 29 measures the perpendicularity of cylindrical object 300's forward mating surface with respect to the centerline C of cylindrical object 300, as established by forward 17 and aft chuck 12.

Length LVDT 31 is affixed to the granite surface plate 30 at the aft end of cylindrical object 300, and is used to measure the overall length of cylindrical object 300. That is, length LVDT 31 measures the length of cylindrical object 300 from the forward mating surface to the far aft surface of cylindrical object 300 (e.g., the BLK2 RAM nozzle edge). Perpendicularity LVDT 29 and length LVDT 31 are located at opposite axial-longitudinal ends of cylindrical object 300, each LVDT located in the vicinity of one of the axial-longitudinal ends.

To ensure accuracy of an LVDT, the LVDT must undergo a regular calibration to reset the zero location and linearize the LVDT. Generally speaking, a calibration of this nature is commonly referred to as "mastering." In the exemplary inventive practice illustrated herein, inventive gage 100 requires mastering for each of the three LVDTs, to be repeated periodically, e.g., every twenty-four hours. Suitable intervals for mastering can vary in accordance with inventive embodiments. Mastering ensures that the LVDTs give the proper measurement data.

Inventive gage 100 includes integrated and semi-automated mastering systems for all three LVDTs. Surface profile LVDT 25 uses a surface profile LVDT mastering block 32, which is located on the side of back datum plate 28 and contains a stepped surface. The stepped surface is a precision ground surface of two heights, known to be dimensionally located to a tight manufacturing tolerance between the high step and the low step. The height between the two surfaces is half of the range of surface profile LVDT 25 to maintain the LVDT 25 in the accurate range of sensitivity. The software causes surface profile LVDT 25 to move onto the high step of surface profile LVDT mastering block 32, using the X-axis and Y-axis. The reading of the surface profile LVDT 25 is recorded at that location.

The software then moves surface profile LVDT 25 onto the low step of surface profile LVDT mastering block 32, using the X-axis and Y-axis. The surface profile LVDT 25 reading is also recorded at that location. The software then linearizes surface profile LVDT 25 based on the difference between the two readings and the known dimensional value of the step on surface profile LVDT mastering block 32. Also as a result of the mastering process, surface profile LVDT 25 is also located a known distance from the datum centerline C between the forward chuck 17 and the aft chuck 12, given that surface profile LVDT mastering block 32 is located a known distance from datum centerline C. This process is performed autonomously, requiring no operator interaction to achieve the mastering of surface profile LVDT 25.

Perpendicularity LVDT 29 uses a perpendicularity LVDT mastering block 33, which is located on the front of back datum plate 28 and which also contains a stepped surface. The stepped surface of mastering block 33 is a precision ground surface of two heights, known to be dimensionally located to a tight manufacturing tolerance between the high step and the low step. The height between the two surfaces is half of the range of the perpendicularity LVDT 29 to maintain LVDT 29 in the accurate range of sensitivity. Perpendicularity LVDT mastering block 33 rotates using a thrust bearing or similar component, and locates using a ball detent or similar component.

The operator of the present invention's gage 100 rotates perpendicularity LVDT mastering block 33 into the proper location, as marked on perpendicularity LVDT mastering block 33 and indicated on the software. The ball dent clicks perpendicularity LVDT mastering block 33 into the proper location. The software then takes a reading from perpendicularity LVDT 29. The software then directs the user to rotate perpendicularity LVDT mastering block 33 to the next surface on the step. The software then takes another reading from perpendicularity LVDT 29. The software then linearizes perpendicularity LVDT 29 based on the difference between the two perpendicularity LVDT 29 readings and the known dimensional value of the step on perpendicularity LVDT mastering block 33. Perpendicularity LVDT 29 is then mastered, and the software directs the operator to rotate perpendicularity LVDT mastering block 33 to the location specified for BLK2 RAM component measurement.

The length LVDT 31 uses a length LVDT mastering block 34, which is located on the front of the moveable tailstock 13 and which contains a stepped surface. The stepped surface is a precision ground surface of two heights, known to be dimensionally located to a tight manufacturing tolerance between the high step and the low step. Length LVDT mastering block 34 is located on a precision slide to allow the stepped surface to translate relative to length LVDT 31. The height between the two surfaces is half of the range of length LVDT 31 to maintain LVDT 31 in the accurate range of sensitivity.

To begin the length LVDT 31 mastering process, the software directs the user to locate the tailstock 13 using the length LVDT calibration pin 35. The operator engages length LVDT calibration pin 35 into the bushing on the side of moveable tailstock 13. The rear handle 36 of gage 100 is then rotated clockwise to drive tailstock 13 until the bushing on moveable tailstock 13 makes contact with length LVDT calibration pin 35. When the proper location and torque is reached, the torque limiter 16 prevents further advancement of the tailstock 13.

The software then directs the user to slide length LVDT mastering block 34 to the indicated step. The length LVDT 31 reading is recorded at that location. The software then directs the user to slide the length LVDT mastering block 34 to the second step. The length LVDT 31 reading is also recorded at that location. The software then linearizes length LVDT 31 based on the difference between the two readings and the known dimensional value of the step on length LVDT mastering block 34. Also, as a result of the mastering process, length LVDT 31 is located a known distance from back datum plate 28, because length LVDT mastering block 34 is located a known distance from the datum surface of the datum back plate 28.

At the conclusion of the automated inspection process, the gage 100 software analyzes the data acquired during the automated process and determines if the cylindrical object 300 being measured meets the dimensional tolerances indicated by the design drawing. These requirements include the surface profile along the length of the cylindrical object 300, the perpendicularity of the forward mating face, and the overall length. The software then initiates a data sheet with a summary of the pass/fail results of the inspection to be printed. The data sheet contains the results of the manual pin checks, as well as the automated portions and data regarding serial number, part number, operator number and signature.

The inventive gage 100 may also employ several safety features to prevent damage to the work piece 300, damage to the gage 100, or injury to the operator and bystanders. Plural (e.g., two) emergency stop switches 37 are located on the granite surface plate 30. Activation of emergency stop switches 37 results in the immediate halt to all automated processes and motor operation. The software also has an emergency stop switch located on screen, activated by touching the button on screen. Furthermore, primary datum pin 18, perpendicularity pin 19, lower pin 20, and length calibration pin 22 all use fiber optic sensor switches 40. The fiber optic switches use a beam of light to determine, via a fiber optic controller connected to the motor controller 203 and connected to the gage 100 software, if a pin has been left engaged into the component. The software will not allow movement of the motors 23, 38, and 39 if a pin is left engaged. Two mechanical snap action safety switches 41 are used on the sliding forward datum surface 15 and on the sliding envelope pin 21. If either of the mechanical snap action switches 41 indicates engagement, the software will not allow movement of the motors.

In order to relate voltage changes to numerical measurement, each linear variable differential transformer (LVDT) needs to be linearized with slope values. To this end, a voltage measurement is taken at a known dimensional location, and then a second voltage measurement is taken at another known dimensional location. The two measured voltage values and the two known locational (dimensional) values are then used to calculate the linear slope value. This slope value provides the exact linear dimensional value of the location of the LVDT probe, and can be applied to any voltage value measured by the LVDT. Each LVDT has its own unique linear slope value associated therewith.

Using an external set master, software resident in computer 201 memory is capable of calculating and setting a value of zero inches for an LVDT along a datum axis line. A set master is a piece of calibrated hardware that provides a known dimensional location used for calibrating measuring equipment. The set master provides a known location or dimension value that can then be related back to the measuring equipment.

With the aid of the set master, a value of zero inches is calculated and set for each LVDT along a datum axis line X. After determining the linear slope value, a numerical value is added to or subtracted from the measured value. This addition/subtraction operation provides the exact linear dimensional value of where the LVDT probe is located in relation to a known location of a three-dimensional (x-y-z) coordinate system. The location of an LVDT is thus determined, with use of a set master, in order that the LVDT measurement can establish a home location (or zero point) along a linear axis X.

Computer 201 calculates linear measurement values based on the linear slope values that computer 201 calculated from the signals obtained by computer 201 from the LVDTs. The linear measurement values are used to measure the cylindrical objectd (e.g., cylindrical tube) 300 in selected respects. The linear measurement values may be represented, for instance, in inches or millimeters or centimeters. Inventive practice of linear measurement can involve English (e.g., inches) or metric (e.g., millimeters or centimeters) or practically any other system of linear measurement.

According to exemplary inventive practice, measurement operations are performed for one or more GD&T features such as "circular-runout" tolerance, "total-runout" tolerance, and/or "linear-profile" tolerance. Computer 201 executes computer program logic and communicates with plural (e.g., multiple) LVDTs to measure these GD&T features of cylindrical object 300. Depending on the inventive embodiment, the computer may perform same or similar types of measurements with respect to one or plural cylindrical objects.

The term "geometric dimensioning and tolerancing" (acronym, "GD&T") refers to implementation of a set of standard symbols for defining parts and assembly features and their tolerance zones in dimensioning engineering drawings. In addition, GD&T may define a part based on how it functions. GD&T facilitates understanding of design intent by providing better tools for describing the drawings. ASME Y14.5M-1994 is a currently accepted authority for geometric dimensioning and tolerancing standards.

GD&T runout tolerance is a geometric tolerance that controls the form, orientation, and location of a cylindrical object (e.g., cylindrical part), or one or more portions thereof, as it rotates about its longitudinal axis. Circular runout is a runout with respect to one or more cross-sections of a cylindrical object as it rotates. Total runout is a runout with respect to the entire length of a cylindrical object as it rotates. Runout tolerance controls the relationship of one or more features of a part to a datum axis A during a full 360 degree rotation about the datum axis. GD&T profile tolerance defines a uniform boundary around a surface within which the elements of the surface must lie. GD&T linear-profile tolerance is a uniform two-dimensional zone limited by two parallel zone-lines extending along the length of a feature.

As shown in FIGS. 3 and 8, cylindrical tube 300 is characterized by a rotational longitudinal axis A, and by rotatability in clockwise and/or counterclockwise direction r about axis A. In order to perform runout measurements with respect to various points on the surface of cylindrical object 300, the inventive practitioner rotates cylindrical object 300 about its axis A in order that one or more LVDTs measure distance(s) from the LVDT(s) to cylindrical object 300 at the various points.

Mutifarious numbers and configurations of sensors (e.g., LVDTs) are possible in accordance with the present invention. Depending on the inventive embodiment, the LVDTs can be arranged in a variety of ways, in keeping with the measurement objectives of the practitioner of the present invention. For instance, one or more LVDTS can be positioned point perpendicularly to axis X from a first direction, and one or more LVDTs can be positioned to point perpendicularly to axis X from a second direction (e.g., ninety degrees removed from the first direction). A first horizontal array of parallel LVDTs can lie in the horizontal geometric plane of axis X, and a second horizontal array of parallel LVDTs can lie in the vertical geometric plane of axis X. These types of LVDT arrangements can be used for effecting runout measurements and/or profile measurements. As another example, one or more LVDTs can be positioned to point perpendicularly (e.g., parallel to and/or coincident with axis X) to one or both end faces of cylindrical object 300.

Rotation of cylindrical object 300 can be accomplished in various manners, depending on the inventive embodiment. According to frequent inventive practice, a rotational housing (e.g., a securement-and-rotatability device) is used that mechanically fixes a cylindrical body along its axis X so as to enable manual or mechanical or electromechanical rotation of the cylindrical body about its axis X. Depending on the inventive embodiment, securement and rotatability of a cylindrical body can be effected using, for instance, a mandrel, spindle, arbor, or other device that holds the cylindrical body in place along its axis X while rotating the cylindrical body, or permitting the cylindrical body to be rotated, in rotational direction(s) r.

For instance as disclosed by Leon '656, an executable algorithmic program and the measured values taken from the LVDTs can be used by a computer to determine if the measurements fall within the acceptable dimensional boundaries specified by the CT component drawing(s). Computer 201 can save the results (e.g., measured values and tolerance determinations) to a database (e.g., an encrypted database), display them on a monitor connected to computer 201, and send them to a printer connected to computer 201.

For example, to evaluate runout tolerance, computer 201 communicates with each LVDT 200 used to measure GD&T runout on a surface of cylindrical object (e.g., CT) 300. Computer 201 software measures and calculates the physical distance of the cylindrical object's surface from the centerline of the axis of the cylindrical object. The computer program then compares the measured runout values to the dimensional requirements of the cylindrical object 300 and the GD&T runout tolerance.

As another example, to evaluate linear-profile tolerance, computer 201 communicates with each LVDT used to measure GD&T linear-profile tolerance on a surface of cylindrical object 300. The inventive software measures a linear path along the surface of the cylindrical object 300 and calculates how much it varies from the established axis. The measured values must fall within the two designated parallel zone-lines to be considered acceptable.

In accordance with exemplary computer logic of inventive software as taught by Leon '656, a pass-or-fail result is determined for each item measured. Each measurement is compared to the drawing dimensional requirements. If the measured result falls within the allowable dimensional requirements, a "Pass" value is given. If the measured result does not meet the dimensional requirements, a "Fail" value is given. The pass-or-fail result for each measured item is presented by computer 201 to the inventive practitioner.

Leon's application Ser. No. 14/302,656 discloses exemplary practice of engineering tolerance evaluation of a cylindrical object 300 such as a cylindrical tube (CT). An individual LVDT is calibrated and zeroed; these actions are taken for each LVDT. Using LVDTs and cylindrical tube inspection software, GD&T values are measured and processed for an individual cylindrical object; these actions are taken for each cylindrical object in order to be evaluated with respect to one or more aspects of engineering tolerancing. Note that the measuring and processing operations can be performed for each of plural cylindrical objects.

Leon '656 discloses process-logic functions and attributes of his methodology, which implements LVDTs and his software. The inventive practitioner performs a series of manual Go/No-Go fit checks. The inventive software collects the user-entered "Pass" or "Fail" results for the manually performed fit checks. Note the possibility that a machine part passes all LVDT checks performed in accordance with inventive practice, yet fails the overall inspection. For instance, if a pin does not actually fit where it is supposed to fit, the part is rejected. Geometric accuracy is needed of both size and location.

Leon '656's software communicates with the gage hardware, e.g., LVDTs and other electromechanical devices, and collects sensor data from measuring devices such as LVDTs. The software of Leon '656 collects data from the LVDTs with the aid of a conditioning card, and converts the electromagnetic pulses received from the LVDTs to language that the computer can understand; in particular, the collected data is converted into dimensional values by the Leon '656's software. The linear measurements can be described according to either the English measurement system (e.g., in inches or feet) or the metric measurement system (e.g., in millimeters, centimeters, or meters), according to the preference of the inventive practitioner. (Block "4")

Leon '656's software then processes the readings; this processing includes comparing the measured dimensional data to dimensional requirements of the cylindrical tube. Based on the comparison of measured dimensional data versus dimensional requirements, Leon '656's software determines the "Pass" or "Fail" result for each feature or item being measured. All of the measured values and all of the Pass-or-Fail" results are saved by the Leon '656's software to a database. A digital report may be generated by Leon '656's software, and the same report may be printed as a hardcopy.

Inventive practice is described herein in exemplary fashion in association with a weapon component known as the BLK2 RAM Gage. Nevertheless, multifarious other applications of the present invention are possible. An inventive gage can be adapted to a variety of cylindrical parts that require inspection of features with respect to a centerline. The pin checks at the forward and aft ends of the inventive gage can be modified in size or position to fit various work pieces. Furthermore, the pins may be removed, or additional pins may be added. Depending on the inventive embodiment, the pins may be of either circular or non-circular cross-section. According to some inventive embodiments, there are no pins present at all.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. An apparatus for performing dimensional measurements with respect to a cylindrical object, said cylindrical object being characterized by a geometric longitudinal axis, a substantially cylindrical surface, two geometric axial-longitudinal ends, and a geometric longitudinal axial plane in which lies said geometric longitudinal axis, the apparatus comprising:

a movable sensor, capable of measuring distance between said movable sensor and said cylindrical surface at each of plural locations of said movable sensor, wherein said movable sensor is movable in a direction parallel to said geometric longitudinal axis and is movable in a direction perpendicular to said geometric longitudinal axial plane;

two coaxial rotatable chucks, capable of grasping said cylindrical object at said two geometric axial-longitudinal ends;

a first motor, capable of rotating a said coaxial rotatable chuck and thereby rotating said cylindrical object about said geometric longitudinal axis;

a second motor, capable of moving said movable sensor in said direction parallel to said geometric longitudinal axis;

a third motor, capable moving said movable sensor in said direction perpendicular to said geometric longitudinal axial plane.

2. The apparatus for performing dimensional measurements as recited in claim 1, wherein said movable sensor is a movable linear variable differential transformer.

3. The apparatus for performing dimensional measurements as recited in claim 2, wherein:
said geometric longitudinal axis is horizontal;
said geometric longitudinal axial plane is vertical;
said direction parallel to said geometric longitudinal axis is horizontal;
said direction perpendicular to said geometric longitudinal axial plane is horizontal.

4. The apparatus for performing dimensional measurements as recited in claim 2, the apparatus further comprising a computer, said computer having computer code characterized by computer program logic and stored on a non-transitory computer readable storage medium, said computer code being executable by said computer so that, in accordance with said computer program logic, said computer is capable of processing measurements taken by said movable linear variable differential transformer with respect to said substantially cylindrical surface of said cylindrical object:
at different rotational positions of said cylindrical object;
at different translational positions of said movable linear variable differential transformer in said direction parallel to said geometric longitudinal axis;
at different translational positions of said movable linear variable differential transformer in said direction perpendicular to said geometric longitudinal axial plane.

5. The apparatus for performing dimensional measurements as recited in claim 4, said computer code being executable by said computer so that, in accordance with said computer program logic, said computer is capable of:
controlling, via said first motor, the rotation of said cylindrical object about said geometric longitudinal axis;
controlling, via said second motor, the movement of said movable sensor in said direction parallel to said geometric longitudinal axis;
controlling, via said third motor, the movement of said movable sensor in said direction perpendicular to said geometric longitudinal axial plane.

6. The apparatus for performing dimensional measurements as recited in claim 5, wherein said processing by said computer includes determining at least one characteristic pertaining to the profile of said substantially cylindrical surface of said cylindrical object.

7. The apparatus for performing dimensional measurements as recited in claim 5, the apparatus further comprising a motor controller and a conditioning card, wherein:
said computer receives, via said conditioning card, data signals from said movable linear variable differential transformer;
said computer transmits, via said motor controller, control signals to said first motor, said second motor, and said third motor.

8. The apparatus for performing dimensional measurements as recited in claim 7, wherein:
said conditioning card conditions said data signals prior to said receipt of said data signals by said computer;
said processing by said computer includes determining at least one characteristic pertaining to the profile of said substantially cylindrical surface of said cylindrical object;
said geometric longitudinal axis is horizontal;
said geometric longitudinal axial plane is vertical;
said direction parallel to said geometric longitudinal axis is horizontal;
said direction perpendicular to said geometric longitudinal axial plane is horizontal.

9. The apparatus for performing dimensional measurements as recited in claim 2, wherein:
said cylindrical object is characterized by an end surface at a said axial-longitudinal end;
the apparatus further comprises a stationary linear variable differential transformer;
said stationary linear variable differential transformer is situated in the vicinity of said end surface and is capable of measuring distance between said stationary linear variable differential transformer and said end surface.

10. The apparatus for performing dimensional measurements as recited in claim 9, wherein:
the apparatus further comprises a computer;
said computer has computer code characterized by computer program logic and stored on a non-transitory computer readable storage medium, said computer code being executable by said computer so that, in accordance with said computer program logic, said computer is capable of processing said measurements taken by said stationary linear variable differential transformer with respect to said cylindrical object;
said processing by said computer includes determining at least one characteristic pertaining to the perpendicularity of said end surface with respect to said geometric longitudinal axis;
said processing of said measurements includes processing said measurements taken by said stationary linear variable differential transformer with respect to said cylindrical object at different rotational positions of said cylindrical object.

11. The apparatus for performing dimensional measurements as recited in claim 2, wherein:
said two geometric axial-longitudinal ends are a first said geometric axial-longitudinal end and a second said geometric axial-longitudinal end;
the apparatus further comprises a stationary linear variable differential transformer;
said stationary linear variable differential transformer is situated in the vicinity of the first said geometric axial-longitudinal end and is capable of measuring distance between said stationary linear variable differential transformer and the second said geometric axial-longitudinal end;
said computer has computer code characterized by computer program logic and stored on a non-transitory computer readable storage medium, said computer code being executable by said computer so that, in accordance with said computer program logic, said computer is capable of processing said measurements taken by said stationary linear variable differential transformer with respect to said cylindrical object;
said processing by said computer includes determining at least one characteristic pertaining to the length of said cylindrical object.

12. The apparatus for performing dimensional measurements as recited in claim 2, the apparatus further comprising a computer and at least one stationary linear variable differential transformer, said computer having computer code characterized by computer program logic and stored on a non-transitory computer readable storage medium, said computer code being executable by said computer so that, in accordance with said computer program logic, said computer is capable of:

processing measurements taken by said movable linear variable differential transformer with respect to said cylindrical object: at different rotational positions of said cylindrical object; at different translational positions of said movable linear variable differential transformer in said direction parallel to said geometric longitudinal axis; at different translational positions of said movable linear variable differential transformer in said direction perpendicular to said geometric longitudinal axial plane;

processing measurements taken by said at least one stationary linear variable differential transformer with respect to said cylindrical object at different rotational positions of said cylindrical object.

13. The apparatus for performing dimensional measurements as recited in claim 12, said computer code being executable by said computer so that, in accordance with said computer program logic, said computer is capable of:
controlling, via said first motor, the rotation of said cylindrical object about said geometric longitudinal axis;
controlling, via said second motor, the movement of said movable sensor in said direction parallel to said geometric longitudinal axis;
controlling, via said third motor, the movement of said movable sensor in said direction perpendicular to said geometric longitudinal axial plane.

14. The apparatus for performing dimensional measurements as recited in claim 13, the apparatus further comprising a motor controller and a conditioning card, wherein:
said computer receives, via said conditioning card, data signals from said movable linear variable differential transformer;
said computer transmits, via said motor controller, control signals to said first motor, said second motor, and said third motor;
said processing by said computer of said measurements taken by said movable linear variable differential transformer with respect to said cylindrical object includes determining at least one characteristic pertaining to the profile of said substantially cylindrical surface of said cylindrical object;
said processing by said computer of said measurements taken by said at least one stationary variable differential transformer with respect to said cylindrical object includes determining at least one characteristic pertaining to the perpendicularity of at least one end portion of said cylindrical object, said at least one end portion of said cylindrical object being located at at least one of said two geometric axial-longitudinal ends of said cylindrical object.

15. The apparatus for performing dimensional measurements as recited in claim 13, wherein:
said processing by said computer of said measurements taken by said movable linear variable differential transformer with respect to said cylindrical object includes determining at least one characteristic pertaining to the profile of said substantially cylindrical surface of said cylindrical object;
said processing by said computer of said measurements taken by said at least one stationary variable differential transformer with respect to said cylindrical object includes determining at least one characteristic pertaining to the length of said cylindrical object.

16. The apparatus for performing dimensional measurements as recited in claim 13, wherein:
said processing by said computer of said measurements taken by said movable linear variable differential transformer with respect to said cylindrical object includes determining at least one characteristic pertaining to the profile of said substantially cylindrical surface of said cylindrical object;
said processing by said computer of said measurements taken by said at least one stationary variable differential transformer with respect to said cylindrical object includes determining at least one characteristic pertaining to the perpendicularity of at least one end portion of said cylindrical object, said at least one end portion of said cylindrical object being located at at least one of said two geometric axial-longitudinal ends of said cylindrical object;
said processing by said computer of said measurements taken by said at least one stationary variable differential transformer with respect to said cylindrical object includes determining at least one characteristic pertaining to the length of said cylindrical object.

17. A dimensional measurement system comprising:
a securement mechanism, for rotatably holding a cylindrical object having a longitudinal axis;
a mobile LVDT, movable with respect to said cylindrical object in an axial-longitudinal direction and a transverse direction, said axial-longitudinal direction being parallel to said longitudinal axis, said transverse direction being normal to said longitudinal axis;
a rotational motor, for causing said securement mechanism to rotate said cylindrical object about said longitudinal axis;
an axial-longitudinal mobility motor, for causing said movement of said mobile LVDT in said axial-longitudinal direction;
a transverse mobility motor, for causing said movement of said mobile LVDT in said transverse direction;
a computer configured to execute computer code stored on a non-transitory computer readable storage medium so that said computer is capable of:
inputting mobile LVDT data, said mobile LVDT data including measuring performed by said mobile LVDT at plural positions of said mobile LVDT in said axial-longitudinal direction, at plural positions of said mobile LVDT in said transverse direction, and at plural positions of said cylindrical object in its rotation;
outputting motor control data, for controlling said rotational motor, said axial-longitudinal mobility motor, and said transverse mobility motor;
processing said mobile LVDT data to obtain information relating to the configuration of said cylindrical object.

18. The dimensional measurement system of claim 17, wherein said cylindrical object further has two axial-longitudinal ends and a circumferential surface between said two axial-longitudinal ends, and wherein said information obtained by said processing of said mobile LVDT data includes information relating to the shape of said circumferential surface of said cylindrical object.

19. The dimensional measurement system of claim 18, wherein:
the dimensional measurement system further comprises at least one immobile LVDT;
said immobile LVDT is positioned proximate at least one said axial-longitudinal end;
said computer is configured to execute said computer code so that said computer is further capable of:
inputting immobile LVDT data, said immobile LVDT data including measuring performed by said at least one immobile LVDT at plural positions of said cylindrical object in its rotation;

processing said immobile LVDT data to obtain information relating to the configuration of said cylindrical object;

said information obtained by said processing of said immobile LVDT data includes information relating to at least one of: the length of said cylindrical object; the shape of said cylindrical object at at least one said axial-longitudinal end.

20. The dimensional measurement system of claim 19, further comprising a motor controller and a conditioning card, wherein:

said motor controller is for activating said rotational motor, said axial-longitudinal mobility motor, and said transverse mobility motor;

said conditioning card is for conditioning data signals for input into said computer, said conditioning card conditioning: as said mobile LVDT data, data signals transmitted by said mobile LVDT; as said immobile LVDT data, data signals transmitted by said immobile LVDT;

said controlling, by said computer, of said rotational motor, said axial-longitudinal mobility motor, and said transverse mobility motor, includes transmitting of motor control signals to said motor controller.

* * * * *